United States Patent [19]
Hemmer

[11] Patent Number: 5,623,189
[45] Date of Patent: Apr. 22, 1997

[54] AUTOMATIC CONTROL OF TORQUE OR FORCE AT MOVING LOADS

[76] Inventor: Ferdinand J. Hemmer, 740 N. Riverside Dr., Crownsville, Md. 21032

[21] Appl. No.: 293,039

[22] Filed: Aug. 19, 1994

[51] Int. Cl.⁶ ..................................................... H02P 7/00
[52] U.S. Cl. .............................. 318/432; 318/6
[58] Field of Search ..................... 318/6–7, 432, 318/434, 560, 561, 563, 600–601, 632, 611, 615–618

[56] References Cited

U.S. PATENT DOCUMENTS

| | | | |
|---|---|---|---|
| 4,587,469 | 5/1986 | Ikebe et al. | 318/432 |
| 4,992,715 | 2/1991 | Nakamura et al. | 318/432 X |
| 5,263,113 | 11/1993 | Naitoh et al. | 318/432 X |

Primary Examiner—David S. Martin

[57] ABSTRACT

The invention generates a correction signal for the command input to an automatic feedback control system or servo-mechanism used to control the torque, force, or tension acting upon an object or payload that is stationary or is moving relative to the motor housing. The correction signal is proportional to the sum of the torque acceleration and velocity errors. The "torque acceleration error" is the product of the inertia, referred to the motor shaft, and the motor acceleration. The "torque velocity error" is the product of the external damping factor acting on the motor shaft and the motor velocity. The correction is required when the steady state value of motor torque output is sensed and used for the negative feedback signal; this measurement is accomplished with relative ease. The correction would not be necessary if the torque or force were measured or sensed at the moving payload, but this is very difficult, expensive, and is often impractical due to unpredictable characteristics of the payload or possible damage to the payload. The invention also reduces errors by limiting acceleration and velocity of the payload, when its motion is controlled. A common application is machines used for winding or unwinding flexible membranes, such as plastic film or steel cable on reels or drums.

7 Claims, 4 Drawing Sheets

TENSION CONTROL SYSTEM BLOCK DIAGRAM

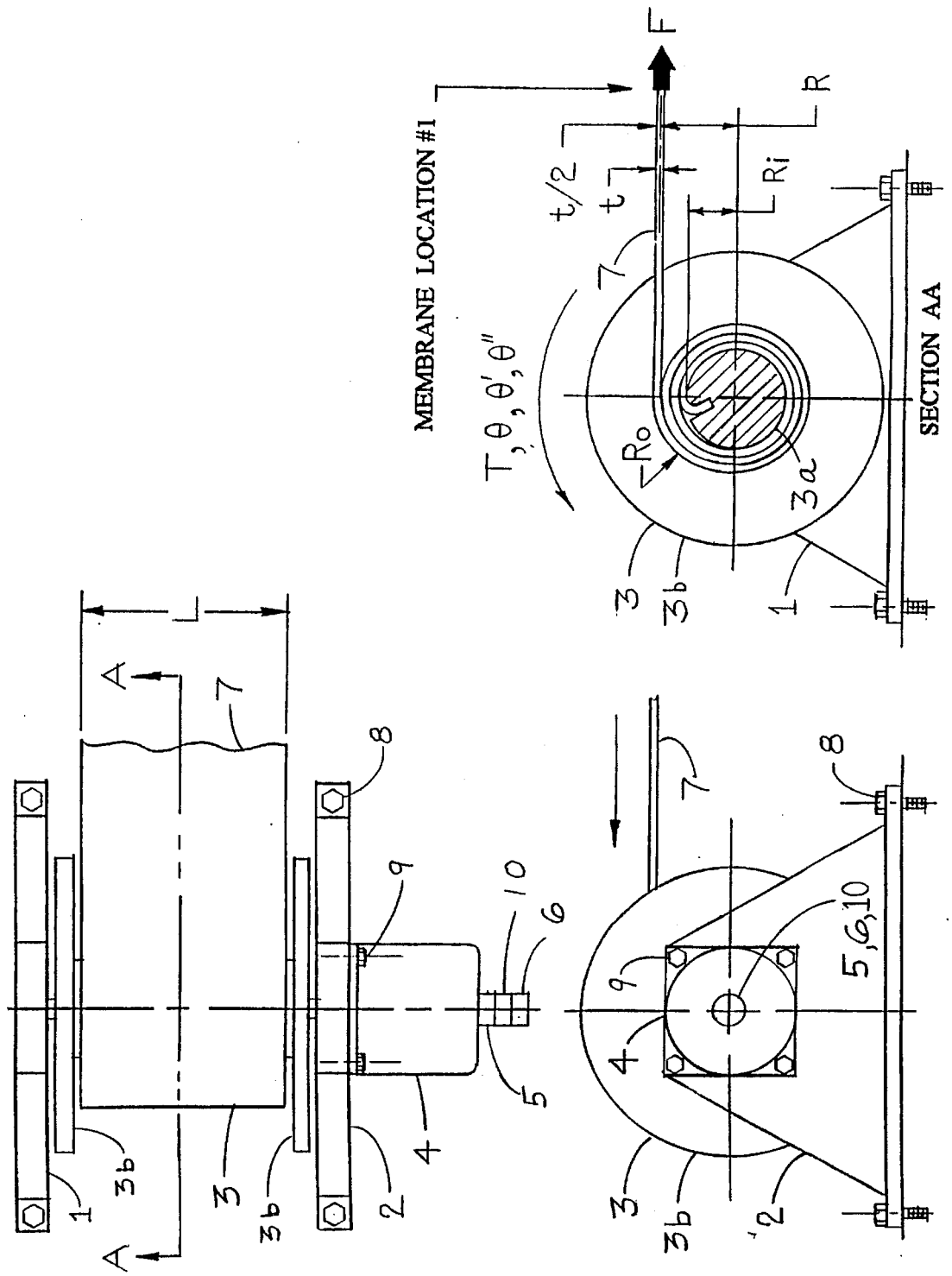

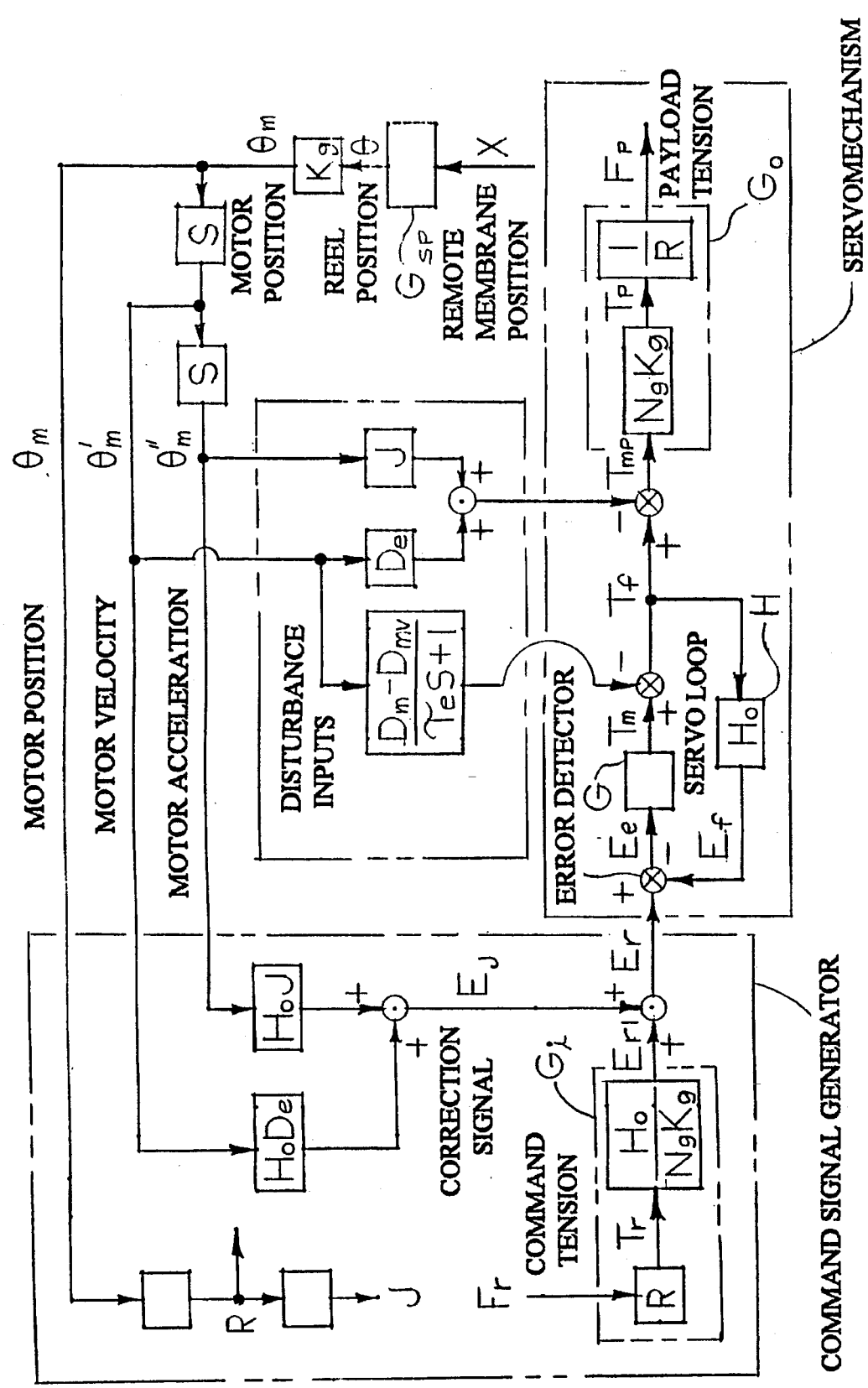
FIG. 2 - TENSION CONTROL SYSTEM BLOCK DIAGRAM

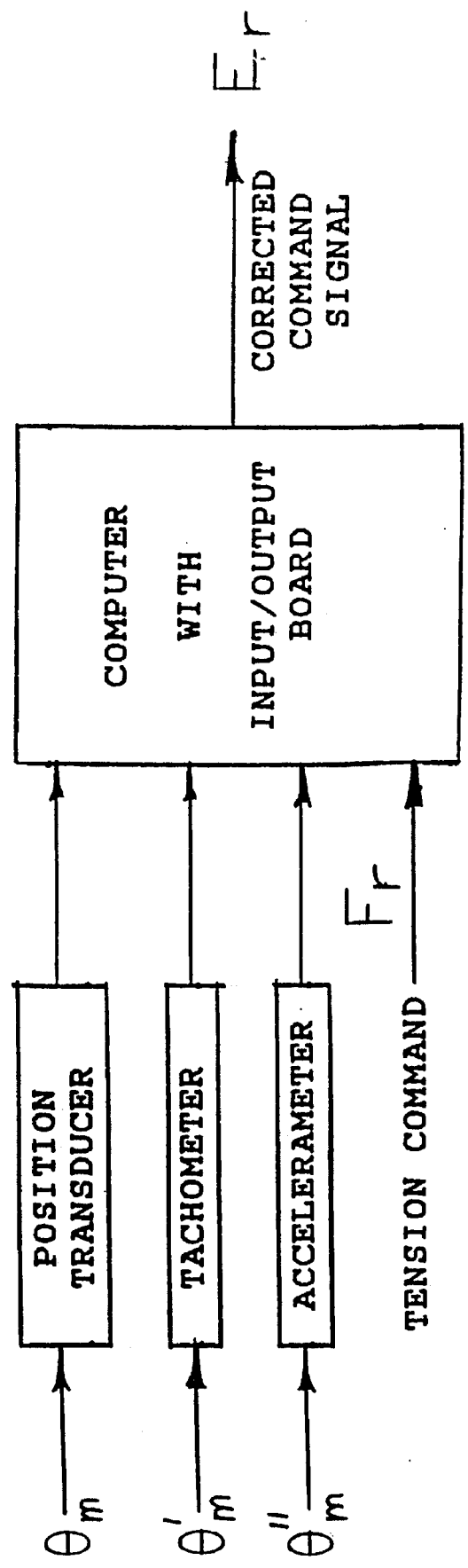
FIG. 3 – COMMAND SIGNAL GENERATOR

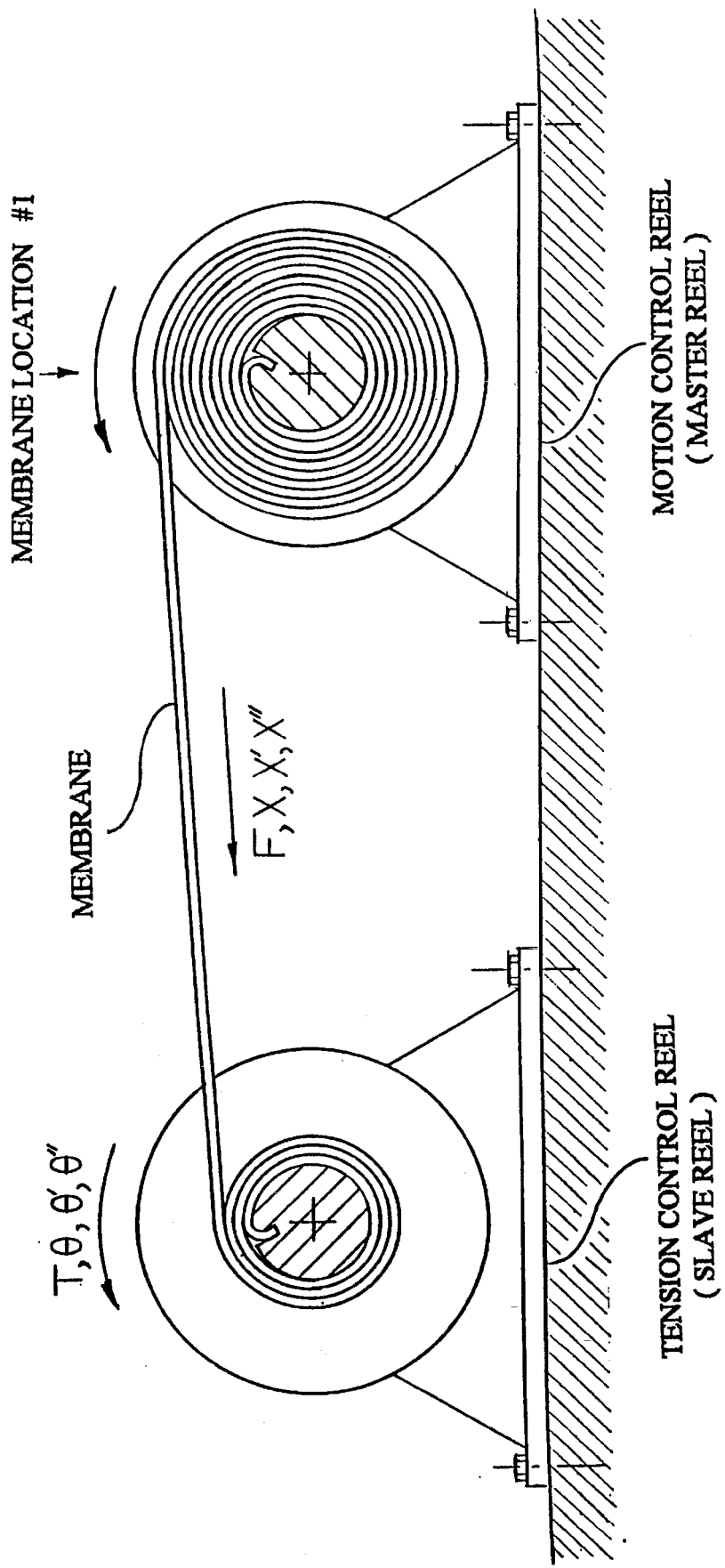
FIG. 4 - CROSSECTION OF A TWO REEL SYSTEM FOR WINDING & UNWINDING MEMBRANE

AUTOMATIC CONTROL OF TORQUE OR FORCE AT MOVING LOADS

BACKGROUND OF THE INVENTION

1. Field of the Invention

This invention relates in general to automatic control of torque, force, or tension acting on a stationary or moving object, called the payload, when the torque or force is produced by a motor with a stationary frame and a movable element that is connected to the payload. The invention relates in particular to systems for which there is no measurement or sensing of torque or force at the payload.

2. Prior Art

Control is typically achieved by means of a negative feedback control system or servomechanism. A typical servo is comprised of a motor that drives the load and an amplifier that supplies power to the motor. The motor output torque or force is sensed by a transducer which feeds a proportional signal back to a summing junction where it is subtracted from a signal that is proportional to the command torque or force. The difference in signals produces an error voltage which is fed into the amplifier which then sends power proportional to the error to the motor. The motor then drives the load until the error is reduced to an acceptably small value or is eliminated. It is noted that the terms motor and amplifier are used in a general sense. The motor may be electric, hydraulic, or pneumatic and the power amplifier must supply the type of power that is appropriate to the type of motor. Sometimes a speed convertor or gear train is connected between the motor and load.

Probably the most common and complex application is tension control of a flexible membrane that is connected to and wound around a drum or reel. Examples of applicable membranes are thin flat sheets such as paper, fabrics, plastic film, and metal foil and circular strands, such as thread, wire, cable, and rope. This application is used to describe the chief embodiment of the invention.

The reel must follow the motion of the membrane in order to maintain the desired membrane tension. When the membrane is moving toward the reel during winding, if the reel moves too slowly the membrane may become slack and if the reel moves too fast the membrane may break. When the membrane is moving away from the reel during unwinding, just the opposite may occur when reel speed is too slow or too fast. Since the membrane is elastic, some tension error can usually be tolerated before slack forms or rupture occurs. Accurate tension control is often important for other reasons, such as quality control of processes performed during the manufacture of the membrane.

In some applications, the membrane is also attached to and wound around another reel, located some distance from the tension control reel. In this system, the second reel controls motion, usually by means of velocity or position servos, and is called the master reel. The tension control reel is called the slave reel, since it must follow the motion dictated by the master reel. Unless otherwise specified, the term "reel" means the slave reel or tension control reel.

There are devices which can sense membrane tension directly, but they are awkward, expensive, and may damage the membrane when they require physical contact with the membrane. Some sensors require that the membrane travel through sets of rollers that subject the membrane to small bend radii, high bending stress, and abrasion. This problem increases for membranes with low flexibility, material strength, and hardness. Another problem is unpredictable variations in membrane characteristics, such as spring rate, which can cause errors in tension measurement. Such variation is likely to occur during manufacture of the membrane.

An indirect method of controlling tension is to control motor output torque in conjunction with the proper torque commands. One method of producing the proper torque command is to sense reel position, which is used to compute the outer radius of the reel. Command torque is computed as the desired tension multiplied by the radius. This method doesn't require any sensor contact with the membrane and is used in the invention.

Controlled torque is feedback torque which is torque sensed at the motor. This method often results in intolerably large transient errors, however, unless changes in speed and/or position occur very slowly.

One type of transient error is proportional to the product of inertia and acceleration; the desired force at the payload, or membrane, is less than controlled force during acceleration and greater during deceleration (negative acceleration). During acceleration, the force available for the payload is the controlled torque minus the torque required to accelerate the inertia of the motor and reel, divided by radius.

A second type of transient error is proportional to the product of external damping and velocity. External damping might result from viscous damping or windage in an electric motor or a torsional damper connected to the motor or reel to cause rapid decay of oscillations. The desired torque at the payload is reduced by the above velocity error. (The effects of internal damping, such as results from back emf in an electric drive or fluid flow losses in a hydraulic drive, are located within the servo loop and are thus minimized or elliminated by negative feedback.)

The motor output torque at zero or fixed speed may be measured by a load cell fastened between a torque arm and the machine mounting frame. This torque is the product of force measured by the load cell and torque arm radius. During acceleration, motor output torque is the above measured torque minus the product of the inertia of the moving element of the motor and its acceleration. The measured torque will also be called steady state motor output torque, herein. This method is generally used when a rotary hydraulic motor is used.

A less accurate method somtimes used for hydraulic or pnuematic motors, is to measure and control the pressure drop between the supply and return ports of the motor. This pressure differential does not account for the pressure and torque losses due to flow resistance and mechanical friction in the motor, which are significant in hydraulic motors.

The technique generally used for electric motors is to sense motor current, which is proportional to developed motor torque at fixed temperature. The torque/current ratio typically drops by 5% as the motor heats up to its allowable operating temperature. The steady state motor output torque is slightly less than developed torque due to motor friction and internal viscous damping losses, such as windage, but these are generally negligible. During acceleration, motor output torque decreases as stated above.

SUMMARY OF THE INVENTION

The invention controls force or torque acting on a stationary or moving payload by automatic feedback control of the torque or force at the motor, which has a stationary frame, combined with modification of the force or torque command to correct for acceleration and velocity forces or torques that must be overcome, but are outside of the servo control loop and thus cannot be corrected by negative feedback. The invention avoids problems associated with sensing of force, torque, or any other variables at a moving payload.

BRIEF DESCRIPTION OF THE DRAWINGS

FIG. 1 illustrates a tension control reel assembly. FIG. 2 is a block diagram of the torque control servo for a tension control reel. FIG. 3 is a block diagram of the command signal generator for the above servo. FIG. 4 shows the configuration of a two-reel membrane transport system, with the master reel deploying.

DETAILED DESCRIPTION

The invention is a system for automatic control of torque, force, or tension acting on a stationary or moving object, called the payload, when the torque or force is produced by a motor with a stationary frame and a movable element that is connected to the payload, without the need for measurement or sensing of any variables at the payload, and where motion of the payload is substantially independent of the torque or force control system.

The preferred embodiment of the invention comprises a membrane tension control reel assembly, as shown in FIG. 1, a motor torque control servomechanism, illustrated in the block diagram of FIG. 2, and a command signal generator, illustrated in the diagram of FIG. 3, with part of its functional description shown to the left of command signal, Er in FIG. 2. A servomechanism, also called a servo, is a negative feedback, automatic controller.

Referring to FIG. 1, the tension control reel is comprised of two pedestals, items 1 & 2, for mounting the reel bearings, with item 2 also used for mounting the motor. The reel assembly is also comprised of the reel or drum, item 3, which contains a cylinder, item 3(*a*), and two flanges, item 3(*b*). It is also comprised of a motor (with or without a gearbox or speed reducer), item 4, a position transducer, item 5, an accelerometer, item 6, a tachometer, item 10, the flexible membrane, item 7, wound around the reel cylinder and extending to the right of the reel to Location #1, and mounting bolts and screws, items 8 & 9, for the pedestals and the motor. It is noted that the frame of the motor is fixed in a stationary position. This is mentioned to distinguish the invention from systems having self propelled loads, where the entire motor and drive train are contained in, and move with the payload.

It is noted that S is the Laplace operator, Dm is the damping factor of the motor, and Te is the time constant for suppling fluid or electric power to the motor. Dmv is inherent motor viscous damping and De is external damping, which is defined as the total viscous damping applied to the motor shaft. Gsp is the membrane compliance transfer function.

Referring to FIG. 2, the forward loop element, G, of the servo is comprised of a servoamplifier followed in series by a motor. There may also be other elements, such as a current loop, servovalve, or a servo controlled variable displacement pump between the amplifier and motor, depending on whether the motor is electric or hydraulic. The servoamplifier comprises an error detector or summing junction, appropriate compensation networks, and a power amplification stage. The feedback element, H, comprises a transducer or other means for sensing the steady state motor output torque. The loop comprised of G and H is called the servo loop or feedback loop.

The output element, Go, is comprised of a speed convertor or gearbox and the reel, having transfer functions or output/input ratios NgKg and 1/R, respectively. The input element, Gi=H/Go so that the payload and command tensions, Fp and Fr, are equal under steady state conditions. The blocks shown in the upper part of FIG. 2 show how acceleration & velocity disturbances and correction signals are introduced and converted to error torques and correction voltages.

In applications where radius R and inertia J are fixed, the position transducer may be deleted and a summing amplifier may be substituted for the computer and input/output board.

Referring to FIG. 3, three transducers are shown for sensing motor position, $\theta_m$, velocity, $\theta_m'$, and acceleration, $\theta_m''$. A small computer or microprocessor is shown for computing correction signals for acceleration and velocity error forces or torques that occur outside the servo loop and thus cannot be corrected by negative feedback. These errors are the product of inertia & motor acceleration and the product of external damping & motor velocity, respectively. An input/output circuit board to receive input signals to the computer and send a corrected command signal out to the servo is shown with the computer. The computer performs the computations of Appendix A and, in an alternate embodiment where the accelerometer is omitted, it also comprises a differentiator to generate an acceleration signal from the tachometer signal.

The invention circumvents prior art problems by sensing velocity and acceleration, in addition to position and motor torque, followed by computation of the reel radius, inertia, torque required to accelerate the inertia, and torque required to overcome the external damping. The former is the product of inertia (which increases with radius) and acceleration and is called "acceleration torque" and the latter is proportional to the product of external damping and velocity and is called "velocity torque". External damping might result from viscous damping or windage in an electric motor or a torsional damper connected to the motor to cause rapid decay of oscillations.

The sum of these torques is converted to a signal, Ej, which is fed to a summing junction at the torque servo input, where it is added to the normal command signal, Er1. The gains, Kacc and Kvel, of the correction elements are set so that the torque acceleration and velocity errors are eliminated over the frequency bandwidth of the tension control servo, and therefore, under steady state conditions of fixed position, velocity, or acceleration. This causes a large reduction in the total steady state tension error at fixed acceleration or at fixed velocity and also reduces the peak error that occurs at the begining of the transient following a change in position or velocity.

The term acceleration is used in its general sense; it may be positive or negative. When negative, it is called deceleration. An accelerometer is the most accurate method for determining acceleration, but it could also be found by sensing velocity and computing the first derivative of velocity or by sensing position and computing the second derivative of position. See Appendix B. The pertainent equations and nomenclature are in Appendix A.

Since the torque correction signals are not in the negative feedback loop of the torque control servo, high speed and high resolution of the computations and data conversions is not required, therefore an inexpensive personal digital computer or microprocessor with an input/output board containing at least three analog-to-digital convertors, one for each analog input, and one digital-to-analog data convertor for the corrected command output signal can be used. The correction signal, Ej, might be termed a signal.

For the single reel embodiment described above, the tension error may be predicted if the motion is known. For example, if the membrane is a cable used for deploying and retrieving an object from an ocean vessel, a knowledge of the frequency and amplitude of the ship motions due to wave action could be used to predict cable motion, and thus tension variation, at the reel.

An alternate embodiment is a two reel transport system as shown in FIG. 4. In this application, the membrane is also attached to and wound around another reel, located some distance from the tension control reel. The second reel controls motion, usually by means of velocity or position servos, and is called the master reel. The tension control reel is called the slave reel, since it must follow the motion dictated by the master reel. Unless otherwise specified, the term "reel" means the slave reel or tension control reel.

When the acceleration can be controlled by another machine, as in a two reel system, the acceleration can be limited by placing limits on the velocity commands at the master reel. This can be done by slowly changing commands, such as the use of ramp inputs, where velocity= acceleration×time until the desired velocity is reached when the command becomes fixed. An alternate technique is to use a low pass command filter for the master reel motion control servo.

In a two reel system, the type of motion controlled is usually the linear motion of the membrane, but it is convenient to sense the angular motion of the motor or reel, therefore the linear motion must be computed as the product of reel radius and angular position or velocity, depending on whether position or velocity is to be controlled. The velocity or position command signal for the master reel, Erm, can be computed and generated in the signal generator of FIG. 3. Master reel radius, Rm, may be computed the same way that slave reel radius, R, is computed as shown in the first paragraph of Appendix A, except to use values that pertain to the master reel. If it is inconvenient to measure master reel position, Rm may be computed as a function of slave reel radius, R, for cases where the volume of membrane contained in the transport system is fixed.

APPENDIX A: PRODUCTION OF TORQUE CORRECTION SIGNAL: Ej

Reel position, N, is zero when the reel is empty and it increases when winding. Position N may be sensed by an absolute encoder, where one pulse per revolution is counted to produce an output voltage that increases in steps. Otherwize, a position transducer with infinite resolution may be used. In either case, the computation errors are negligible. The radius to the center of outermost membrane is:

R=Ri+t/2+dr*n where

Ri=radius of empty slave reel, in.

t=thickness of membrane, in.

n=number of layers on reel dr=change in radius per layer, in.

Case 1—Let the membrane be a sheet having a width slightly less than the width of the reel or drum, L.

dr=t and n=N, where N=reel position, rev.

Case 2—Let the membrane be a strand, such as a wire, rope, or cable having a circular crossection of diameter, d=t.

Ln=L/d−1=number of coils per layer n=N/Ln

Generally dr=(0.1+0.9*sin 60 deg.)*d=0.88*d

The reel system inertia, referred to the motor shaft is:

J=Jm+(Je+Jf)/(Ng*Kg^2)

where

Jm=moment of inertia of motor, lb.in.sec^2

Je=moment of inertia of empty reel, lb.in.sec^2

Jf=moment of inertia of membrane on reel, lb.in.sec^2

Kg=overall speed reduction ratio in drive

Ng=efficiency of Kg

Jf=C1*(Ro^4−Ri^4)

where

Ro=R−t/2

C1=Pi/2*w'/g*L w'=ave. specific weight of membrane on reel, lb./cu.in.

w=specific weight of membrane material, lb./cu.in.

w'=w for sheets, Case 1.

w'=0.86*w, typical, for circular strands, Case 2.

g=acceleration of gravity=386 in./sec./sec.

Pi=3.1416

Required Correction Signal voltage: Ej

Ej is determined as follows: See the block diagram of FIG. 2. Without the correction, the torque error is Tpe= Ng*Kg*Tmp where Tmp=−(J+De/S)*θm"=−(J*θm"+De*θm')

De=(Dmv+Dmve), lb.in./(rad./sec.)

De is total external viscous damping applied to the motor shaft, Dmv is the minimum value of De that is inherent to the motor, such as windage, and Dmve is the damping factor of a torsional damper sometimes added to produce rapid decay of oscillations.

Motor acceleration θm"=Kg*θ" and motor speed θm'= Kg*θ', where θ" and θ' are acceleration and velocity of the reel.

therefore Tpe=−Ng*Kg^2*(J*θ"+De*θ')

The affect of the correction signal, Ej, on payload torque, Tp, must be the same as that of command voltage, Er1, on Tp, therefore:

Tpj/Ej=Tp/Er1=Tp/Tr*Tr/Er1=Gcl/Gi where Gcl is the closed loop transfer function and Gi is the input transfer function for the torque control servo.

Let Gi=H/Go=Ho/(Ng*Kg) so that Gcl=1 and Tp=Tr under steady state conditions. Ho is the static gain of the feedback element for the servo and Go is the output transfer function. Therefore, Tpj=Gcl/Gi*Ej=1*(Ng*Kg/Ho)*Ej Let Tpj=−Tpe, so they cancel out under steady state conditions. Therefore, (Ng*Kg/Ho)*Ej=−[−Ng*Kg^2*(J*θ"+De*θ')]

Ej=+Ho*Kg*(J*θ"+De*θ')=Kaac*θ"+Kvel*θ' where accelerameter element gain, Kacc=Ho*Kg*J and tachometer element gain, Kvel=Ho*Kg*De

I claim:

1. A control system for controlling force or torque at a movable payload where the motion is caused by an external force or torque and said motion is substantially independent of said force or torque control system, said control system being comprised of:

(a) a servomechanism comprised of:

a motor which has a frame that has a fixed position with respect to said movable payload and a movable element that is connected to and applies force or torque to said movable payload, a torque or force detector located at said fixed motor frame for sensing the steady state output torque or force of said motor to produce a feedback signal, an error detector for calculating an error signal equal to a corrected force or torque command signal value minus said feedback signal value, an amplifier that supplies power to said motor proportional to said error signal, (b) a command signal generator comprised of:

a means for detecting velocity and acceleration of said movable element of said motor, a computer or microprocessor for computing command correction signals that are proportional to the product of external damping and velocity and the product of system inertia and acceleration which are added to a force or torque command signal to produce said corrected force or torque command signal, and an input/output circuit board to receive said force or torque command signal and said detected velocity and acceleration signals for said computor and to send said corrected command signal to said error detector of said servomechanism.

2. A force or torque control system according to claim 1 further comprising a damper attached to said motor to reduce oscillations resulting from low compliance.

3. A tension control system for controlling tension in a movable flexible membrane, wound around a slave reel and a master reel, where the motion is caused by tension applied by said master reel located some distance from said slave reel, said tension control system being comprised of:

a) a servomechanism comprised of:

a motor which has a frame that has a fixed position with respect to said movable flexible membrane and a rotatable shaft connected to said slave reel that is connected to and applies tension to said membrane, a torque detector located at said fixed motor frame for sensing the controlled steady state output torque of said motor to produce a feedback signal, an error detector for calculating an error signal equal to a corrected torque command signal value minus said feedback signal value, an amplifier that supplies power to said motor proportional to said error signal, b) a command signal generator comprised of:

a means for detecting position, velocity, and acceleration of said slave reel, a computor or microprocessor for computing, in accordance with physical formulae, said slave reel radius from the axis to the outermost layer of said membrane as a function of said slave reel position, system inertia referred to said motor shaft as a function of said slave reel radius, a command torque signal proportional to the product of command tension and said slave reel radius, command correction signals that are proportional to the product of external damping and velocity and the product of system inertia and acceleration which are added to said torque command signal to produce said corrected torque command signal, an input/output circuit board to receive said detected position, velocity and acceleration signals for said computor and to send said corrected torque command signal to said error detector of said servomechanism.

4. A tension control system according to claim 3 wherein means is provided in said master reel to limit peak acceleration and peak velocity to reduce tension errors.

5. A tension control system according to claim 3 further comprising a torsional damper attached to said motor shaft of said tension control system to reduce oscillations resulting from low system compliance, especially in the unwound portion of said membrane located between said reels.

6. A control system for controlling tension in a movable flexible membrane, wound around a reel, where the motion is caused by an external tension and said motion is substantially independent of the said tension control system, said control system being comprised of:

a) a servomechanism comprised of:

a motor which has a frame that has a fixed position with respect to said movable flexible membrane and a rotatable shaft connected to said reel that is connected to and applies tension to said membrane, a torque detector located at said fixed motor frame for sensing the controlled steady state output torque of said motor to produce a feedback signal, an error detector for calculating an error signal equal to a corrected torque command signal value minus said feedback signal value, an amplifier that supplies power to said motor proportional to said error signal, b) a command signal generator comprised of:

a means for detecting position, velocity, and acceleration of said reel, a computor or microprocessor for computing, in accordance with physical formulae, said reel radius from the axis to the outermost layer of said membrane as a function of said reel position, system inertia referred to said motor shaft as a function of said reel radius, a command torque signal proportional to the product of command tension and said reel radius, command correction signals that are proportional to the product of external damping and velocity and the product of system inertia and acceleration which are added to said torque command signal to produce said corrected torque command signal, and an input/output circuit board to receive said tension command signal and said detected position, velocity and acceleration signals for said computor and to send said corrected torque command signal to said error detector of said servomechanism.

7. A tension control system according to claim 6 further comprising a torsional damper attached to said motor shaft to reduce oscillations resulting from low system compliance, especially in the unwound portion of said membrane located between the point of departure from said reel and a remote location, where an external tension is applied and motion disturbances are introduced.

* * * * *